United States Patent
Lindoff et al.

(10) Patent No.: US 7,990,901 B2
(45) Date of Patent: Aug. 2, 2011

(54) CELL SEARCH SCHEDULING IN A WIRELESS CELLULAR COMMUNICATION NETWORK

(75) Inventors: Bengt Lindoff, Bjärred (SE); Torgny Palenius, Barsebäck (SE); Anders Ericsson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 641 days.

(21) Appl. No.: 10/557,958

(22) PCT Filed: May 7, 2004

(86) PCT No.: PCT/EP2004/004884
§ 371 (c)(1),
(2), (4) Date: Nov. 28, 2006

(87) PCT Pub. No.: WO2004/107784
PCT Pub. Date: Dec. 9, 2004

(65) Prior Publication Data
US 2007/0099652 A1      May 3, 2007

Related U.S. Application Data

(60) Provisional application No. 60/476,329, filed on Jun. 6, 2003.

(30) Foreign Application Priority Data

May 28, 2003   (EP) .................................... 03388042

(51) Int. Cl.
*G08C 17/00* (2006.01)
(52) U.S. Cl. .................. 370/311; 455/127.5; 455/343.2

(58) Field of Classification Search ................... 370/347, 370/335, 311; 375/354, 150; 455/343.1–343.5, 455/574, 127.5
See application file for complete search history.

(56) References Cited

U.S. PATENT DOCUMENTS
5,604,744 A * 2/1997 Andersson et al. ........... 370/347
(Continued)

FOREIGN PATENT DOCUMENTS
WO     WO 93/23963 A     11/1993

OTHER PUBLICATIONS

Yi-Pin Eric Wang and Tony Ottosson, "Cell Search in W-CDMA", IEEE Journal on Selected Areas in Communications, vol. 18, No. 8, Aug. 2000, pp. 1470-1482.*

(Continued)

*Primary Examiner* — Rafael Pérez-Gutiérrez
*Assistant Examiner* — Allahyar Kasraian

(57) ABSTRACT

A method performed by a mobile communication unit (10) when operating in stand-by mode in a wireless cellular communication network. The receiver is activated in periods of relatively short duration ($\tau_0$) to receive paging indicators (21) from the serving base station (20) and to receive identifying signals from the remote base station (30). After the first period a likelihood is assessed that a remote cell has been detected, and following the first period the receiver is activated in a second period of a duration ($\tau_1$) depending an the assessed likelihood. If a remote cell has likely been detected, the second duration is longer than the first duration. Most of its stand-by time the mobile terminal will not detect a new cell, and most of the periods with the receiver activated will therefore be of the short first duration, the Power consumption of the receiver will be correspondingly reduced, and the stand-by time is correspondingly increased.

13 Claims, 4 Drawing Sheets

U.S. PATENT DOCUMENTS

| | | | |
|---|---|---|---|
| 5,883,885 A * | 3/1999 | Raith | 370/311 |
| 5,978,366 A * | 11/1999 | Massingill et al. | 370/337 |
| 6,052,407 A * | 4/2000 | Ciccone et al. | 375/133 |
| 6,311,059 B1 * | 10/2001 | Walton | 455/425 |
| 6,331,971 B1 * | 12/2001 | Raith | 370/311 |
| 6,801,567 B1 * | 10/2004 | Schmidl et al. | 375/149 |
| 6,865,177 B1 * | 3/2005 | Park et al. | 370/350 |
| 7,012,909 B2 * | 3/2006 | Tanno et al. | 370/335 |
| 7,110,376 B2 * | 9/2006 | Lindoff et al. | 370/331 |
| 7,110,438 B2 * | 9/2006 | Ho et al. | 375/147 |
| 7,486,656 B2 * | 2/2009 | Lin | 370/350 |
| 2002/0041579 A1 * | 4/2002 | Tanno et al. | 370/335 |
| 2002/0110185 A1 * | 8/2002 | Ohnishi | 375/150 |
| 2002/0147024 A1 * | 10/2002 | Wan | 455/515 |
| 2003/0032441 A1 * | 2/2003 | Ofuji et al. | 455/525 |
| 2003/0032463 A1 * | 2/2003 | Cannon et al. | 455/574 |
| 2003/0095516 A1 * | 5/2003 | Ok et al. | 370/331 |
| 2003/0108135 A1 * | 6/2003 | Frigon | 375/354 |
| 2003/0174686 A1 * | 9/2003 | Willenegger et al. | 370/342 |
| 2003/0179708 A1 * | 9/2003 | Kamerman et al. | 370/241 |
| 2003/0202541 A1 * | 10/2003 | Lim et al. | 370/503 |
| 2004/0023651 A1 * | 2/2004 | Gollnick et al. | 455/423 |
| 2004/0176039 A1 * | 9/2004 | Leyh et al. | 455/67.11 |
| 2004/0192347 A1 * | 9/2004 | Leizerovich et al. | 455/456.1 |
| 2004/0228393 A1 * | 11/2004 | Chen et al. | 375/150 |
| 2004/0258084 A1 * | 12/2004 | Laroia et al. | 370/437 |
| 2009/0225824 A1 * | 9/2009 | Noh et al. | 375/240 |

OTHER PUBLICATIONS

Ostergaard Nielsen, A. et al., "WCDMA Initial Cell Search", VTC 2000-Fall, IEEE VTS 52nd Vehicular Technology Conference, Boston, MA, Sep. 24-28, 2000, IEEE Vehicular Technology Conference, New York, NY: IEEE, US, vol. 1 of 6, Conf. 52, Sep. 24, 2000, (pp. 377-383).*

* cited by examiner

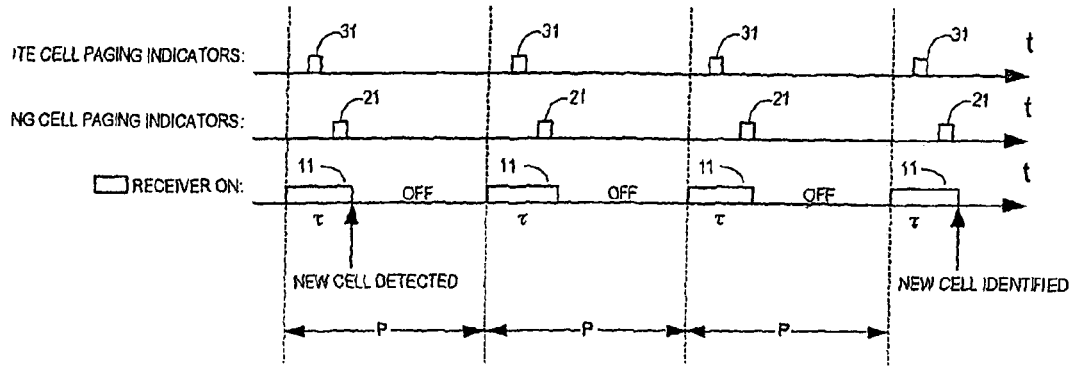
Fig. 3a - PRIOR ART
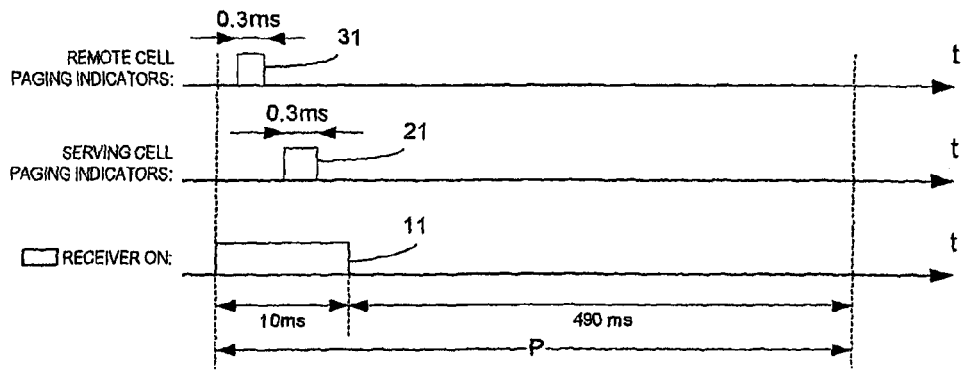
Fig. 3b - PRIOR ART
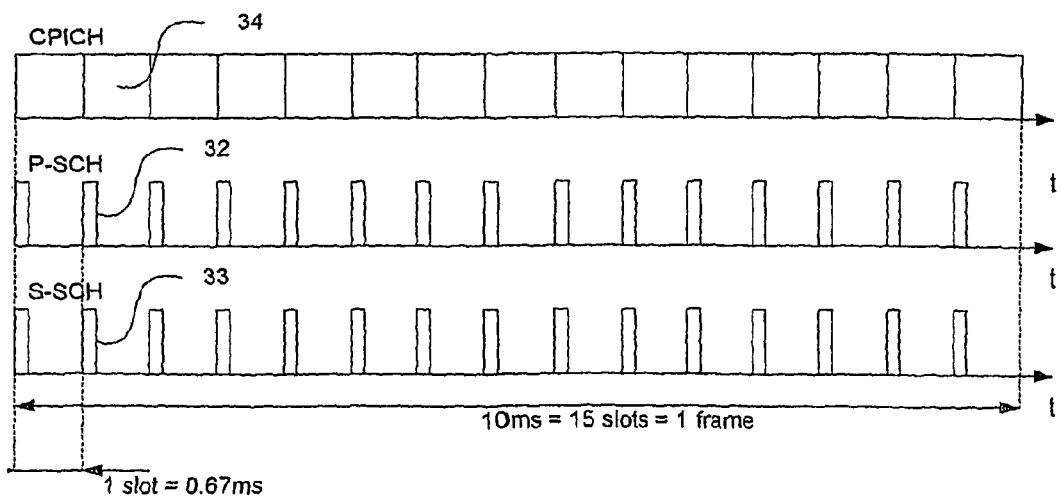
Fig. 3c - PRIOR ART

CELL SEARCH SCHEDULING IN A WIRELESS CELLULAR COMMUNICATION NETWORK This application claims the benefit of U.S. Provisional Application No. 60/476,329, filed Jun. 6, 2003, the disclosure of which is fully incorporated herein by reference.

FIELD OF THE INVENTION

The invention relates to mobile communication in a wireless cellular communication network, where mobile communication units or mobile terminals operating in a serving cell are served by a serving base station in the serving cell, and base stations in remote cells are to be detected and identified before a decision can be made to switch over from the serving base station in the serving cell to a remote base station in a remote cell to serve the mobile communication units.

BACKGROUND OF THE INVENTION

From the point of view of the users of battery operated mobile terminals such as mobile telephones the stand-by time is of great importance. The stand-by time is determined by the consumption of power from the battery, and one way to increase the stand-by time it is to reduce the power consumption of the mobile terminal in its stand-by mode, i.e. when it is on but not in use for communication purposes.

It is known to turn off the power to units and processes in the mobile terminal such as some of the signal processing blocks. In stand-by mode a major task of the mobile terminal is listening to paging indicators and performing measurements and calculations, which are necessary in searching for possible new cells. An example of necessary measurements is measurement of signal quality from neighbouring cells. Another important and power demanding procedure that is performed by the mobile terminal is cell search, i.e. the search for and identification of one or more new cells that each potentially can be used as a new serving cell, if certain conditions are met.

In known Wideband Code Division Multiple Access (WCDMA) systems some of the synchronisation channels such as the Primary Synchronization Channel (P-SCH), the Secondary Synchronization Channel (S-SCH) and the Common Pilot Channel (CPICH) are used to find and to detect new cells. Briefly, the known methods include the following steps:
1. The P-SCH is used to detect a new cell,
2. When a new cell has been detected, the S-SCH is used to find the timing and the scrambling code group of the new cell, and
3. When the timing of the new cell has been found, the CPICH is used for measuring the signal strength of the new cell.

More information about the basic algorithm for making cell search in WCDMA can be found in E. Wang, T. Ottosson: Cell Search in WCDMA. IEEE Journal on selected areas in communications, 18:8:1470-1782, 2000.

FIG. 3a illustrates schematically temporal aspects of a prior art method of cell search in stand-by mode, i.e. when the mobile terminal is turned on but not in use for communication purposes. The figure illustrates the occurrence of remote cell paging indicators, serving cell paging indicators and periods in which the receiver is turned on ('receiver on' periods) as a function of time t. When operating in the serving cell with the serving base station 20, whether in stand-by mode or not, the mobile terminal searches for possible new cells among the remote cells to connect to, should it be required. This is called cell search.

The receiver in the mobile terminal must receive the paging indicators 21 transmitted by the serving base station in the serving cell at regular time intervals P, typically every 0.5-1 s. FIG. 3a also illustrates paging indicators 31 from a remote cell. The receiver is turned on or activated periodically in periods 11 all having the same duration τ to receive the signals comprising paging indicators 21 from the serving base station, and reception is started each time a paging indicator 21, typically 300 μs long (half a slot), is to be received. In order to make a good and meaningful reception of the paging (mainly channel estimation) the receiver should be on for typically 3-5 slots, i.e. for around 2.5 ms. The mobile terminal 10 should preferably receive all paging indicators and react accordingly, and the receiver in the mobile terminal is therefore turned on for at least the duration of the paging indicators 21. The receiver is also receptive to possible signals from remote base stations in remote cells in order to identify possible new cells. Therefore the receiver is turned on for longer periods than the duration of the paging indicators 21. These "receiver on" periods 11 are identified in FIG. 3a. Statistically, a new cell will not be found very often. If a new cell with a stronger signal that the serving cell is within the reception range of the mobile terminal, there are requirements defining how fast a new cell must be detected, if the mobile terminal enters the reception range of a new cell with a stronger signal than the serving cell. In order to fulfil the specification requirements (around 5 s in stand-by mode is a typical value) for detecting a new cell, if new cells are present with stronger signals from the corresponding base stations than from the base station in the serving cell, a total signal reception time of around 80 ms is needed. Distributing the 80 ms over paging indicators (1 per 0.5 s) in a 5 s time window gives a signal reception of around a frame, i.e. 10 ms around every paging indicator 21. In this prior art method the receiver is turned on for periods of the same duration, typically 10 ms, whether or not a new cell has been indicated. This is power consuming. FIG. 3a only illustrates the principle but does not reflect the correct relationship between the durations of the involved periods with the receiver on and off, respectively. In practice the duration τ of the periods with the receiver on will be shorter than illustrated.

FIG. 3b shows an enlarged view of an interval of duration P between two punctuated lines in FIG. 3a. In this view, the receiver is turned on ('receiver on') during a period 11 with a length of 10 milliseconds. This 'receiver on' period is followed by a period with a length of 490 milliseconds in which the receiver is turned off. During the 10 milliseconds period in which the receiver is turned on, a remote cell paging indicator 31 and a serving cell paging indicator 21 is each transmitted during a respective period of 300 microseconds.

FIG. 3c illustrates the timing of two synchronization channels and a common pilot channel during a single frame. One frame is equal to 15 slots or 10 ms or 38400 chips.

The common pilot channel CPICH is transmitted continuously during a slot 34 and during a frame. A first synchronization channel, P-SCH, is transmitted in sequences 32 of 256 chips per slot of 2560 chips, thus giving a duty-cycle of 10%. A second synchronization channel, S-SCH, is transmitted synchronously with the P-SCH channel also in sequences of 33 of 256 chips.

Thus a paging message has a duration corresponding to the duration of half a slot.

It is a purpose of the invention to provide a cell search method that can save battery power in stand-by mode and thus extend the stand-by time of mobile terminals when operating in a wireless cellular communication network.

SUMMARY OF THE INVENTION

In the cell search method of the invention the receiver is turned on, or activated, in stand-by mode, periodically in periods of a first duration ($\tau_0$), to receive the signals comprising paging indicators 21 from the serving base station and to receive possible identification signals from any remote base station. After periods with the receiver activated, an assessment is made of whether there is a realistic possibility or likelihood that a remote base station in a remote cell has been detected. Preferably, a signal indicator such as the signal-to-noise ratio, SNR, of the signal received from the serving base station is taken as a measure of the likelihood, i.e. a good SNR (a high value) indicates that the mobile terminal is relatively close to the serving base station and well within the serving cell, and this is taken as an indication of a small likelihood that a remote base station in a remote cell has been detected; and vice versa, a poor SNR (a low value) indicates that the mobile terminal is relatively close to the boundary of the serving cell, and this is taken as an indication of a high likelihood that a remote base station has been detected. If a remote base station has likely been detected, i.e. if the likelihood is higher than a predetermined value, the method of the invention continues to identify the remote base station, which is a necessary precondition for possibly switching the mobile station to be served by the remote cell, which will then become the serving cell.

The duration of a following period, in which the receiver is activated, is chosen in dependence on the value of the signal indicator which represents the possibility or likelihood that a new cell has been detected. If the signal quality is good, this is taken as an indication that no new remote cell has likely been detected, and the duration of the activated period of the receiver is kept unchanged at the first duration ($\tau_0$). If the signal quality is poor, there is a possibility, or it is likely, that a new remote cell has been detected, and the duration of a following activated period of the receiver is increased to a second duration ($\tau_1$) longer than the first duration ($\tau_0$). In particular, the first duration ($\tau_0$) can be chosen to be shorter than in the traditional method discussed above in connection with FIG. 3, and only in the statistically less frequent cases that a new cell has likely been detected, will the activated period of the receiver be increased to the second duration, which is longer than the first duration and may correspond to the duration in the traditional method discussed above.

Most of its stand-by time the mobile terminal will not detect a new cell, and most of the periods with the receiver activated will therefore be of the short first duration, the power consumption of the receiver will be correspondingly reduced, and the stand-by time is correspondingly increased.

In accordance with the invention, as long as no new cell is detected, the "receiver on" periods are of a first duration $\tau_0$.

The value of the signal indicator is compared to a first predetermined value. A value smaller than the first predetermined value, indicates that a P-SCH in a new cell has not likely been detected, and the duration of the following "receiver on" period is kept unchanged at the first duration $\tau_0$.

A value greater than or equal to the first predetermined value indicates that a new cell may have been detected, and the duration of the following "receiver on" period is increased to a second duration $\tau_1$ greater than the first duration $\tau_0$.

Conveniently, the assessment of whether a new cell is detected can be based on the strength of the signal received from the serving base station. A strong received signal, and consequently, a high signal-to-noise ratio (SNR), indicates that the mobile terminal is close to the serving base station, whereas a weak received signal, and consequently, a low SNR, indicates that the mobile terminal is close to the border of the serving cell, where the likelihood of finding a new cell is higher.

The invention involves detecting whether a primary synchronisation channel (P-SCH) of a remote base station is present. If such a primary synchronisation channel is not present based on a measurement during a first duration of a least selectable duration a repeated step of detecting whether a primary synchronisation channel is present is performed. Thereby, the on-period is kept short to reduce power consumption if there is no indication, in the form of the presence of a primary synchronisation channel, that a remote base station is detected.

Alternatively, if a primary synchronisation channel is present based on a measurement during a first duration of a least selectable duration a repeated step of detecting whether a primary synchronisation channel is present, but based on a measurement during a second period of a second duration that is longer than the first duration is performed. Thereby, the presence of a primary synchronisation channel is verified before further power consuming operations are activated.

The invention also involves detecting whether a secondary synchronisation channel (S-SCH) of a remote base station is present. If a primary synchronisation channel of a remote base station is determined not to be present, based on a measurement during a second period of intermediate length it is determined whether a secondary synchronisation channel is present. In the negative event, it is determined whether a primary synchronisation channel is present based on a measurement during a period of a least selectable length. Alternatively, in the affirmative event, it is determined whether a primary synchronisation channel is present based on a measurement during a period of an intermediate selectable length. Thereby, the presence or lack of presence of the secondary synchronisation channel indicates whether search for a primary synchronisation channel is to be resumed in periods of least selectable length or in periods of intermediate selectable length. Hence, the combination of presence or lack of presence of the two types of synchronisation channels controls the power consumption gradually.

If a primary synchronisation channel of a remote base station is determined to be present, based on a measurement during a second period of intermediate length, it is determined whether a secondary synchronisation channel is present. Additionally, it is detected whether a secondary synchronisation channel is present, based on a measurement during a third period with a duration that is greater than the intermediate duration. Thereby, also the secondary synchronisation channel is detected gradually in periods with gradually increasing length and consequently at gradually increasing power consumption.

Additionally, the invention relates to the use of a method according to the invention and to a mobile communication unit e.g. a mobile cellular phone.

BRIEF DESCRIPTION OF THE DRAWINGS

FIG. 3a illustrates the principle of a timing diagram of a prior art method of cell search, FIG. 3b illustrates a single period of the timing diagram, FIG. 3c illustrates the timing of two synchronization channels and a common pilot channel during a single frame.

DETAILED DESCRIPTION OF THE INVENTION

Figure 1:
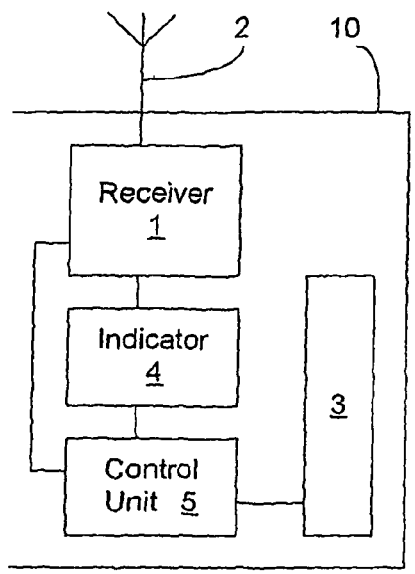
FIG. 1 shows schematically a mobile terminal of the invention.

In FIG. 1 is shown a mobile terminal 10 such as a mobile communication unit, e.g. a mobile telephone. The mobile terminal 10 has in particular a receiver 1 with an antenna 2. Other components for its intended operation, but which are not essential to the understanding of the invention, are included in the box 3. The receiver 1 is arranged to be periodically activated to receive signals with a paging indicator. According to the invention, an indicator 4 is arranged to provide a feature of such a signal received during one or more of the periodically occurring periods. A value of the provided feature is sent to a control unit 5 that is arranged to activate the receiver 1 in periods with a duration that is set in dependence of the value of the provided feature.

Figure 2:
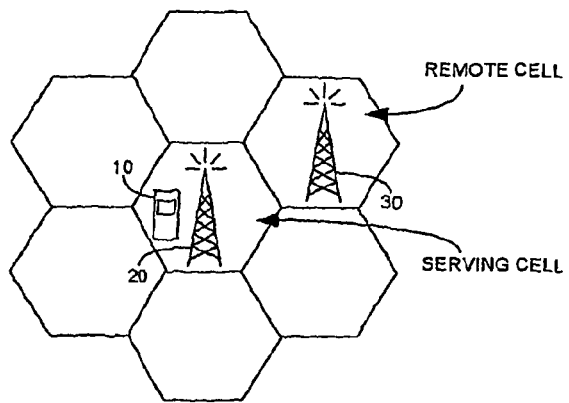
FIG. 2 shows the mobile terminal in FIG. 1 in a wireless cellular communication network.

In FIG. 2 is shown the mobile terminal 10 in FIG. 1 in a wireless cellular communication network e.g. for use in a Wideband Code Division Multiple Access (WCDMA) system. The cellular communication network comprises a serving cell with a serving base station 20 that serves a geographical area around the serving base station. This geographical area is called the serving cell. The mobile terminal 10 in FIG. 1 is shown in the serving cell, where it communicates with the serving base station 20, and the mobile terminal thus operates in the communication network. The communication network also comprises a remote cell with a remote base station 30 that serves the geographical area around the remote base station. This geographical area is called the remote cell. Typically, the communication network comprises several remote cells distributed around the serving cell; in FIG. 2 six remote cells are shown.

Figure 4:
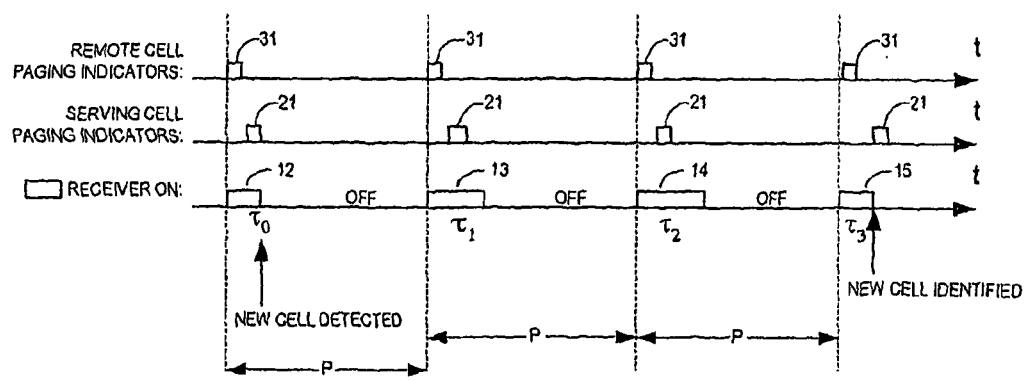
FIG. 4 illustrates the principle of a timing diagram of the method of cell search in a preferred embodiment of the invention.
Figure 5:
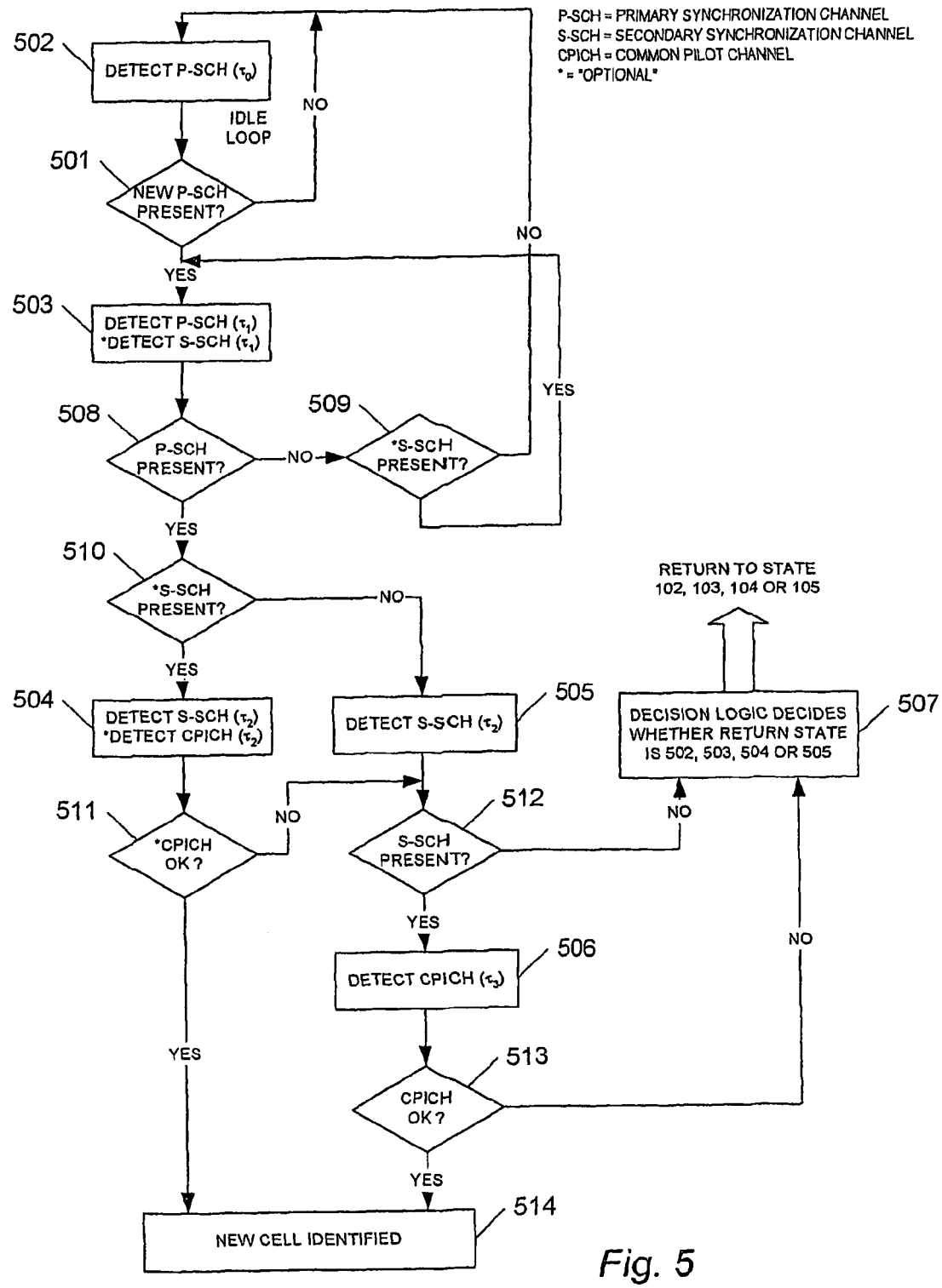
FIG. 5 is a flow chart illustrating the preferred embodiment of the invention.

In FIG. 4 is illustrated a timing diagram of a preferred method of cell search according to the invention, and FIG. 5 shows a flow chart of the preferred method of the invention. Like in the prior art method illustrated in FIG. 3 the serving base station 20 transmits paging indicators 21 at regular intervals, and the receiver in the mobile terminal 10 is turned on in periods including the paging indicators 21 from the serving base station.

The mobile terminal 10 is operating in stand-by mode, i.e. it is connected to the serving base station 20 in the serving cell, but idle. In state 502 in FIG. 5 the receiver in the mobile terminal 10 is turned on, i.e. it is activated, for a period 12 of a first duration $\tau_0$, and which is synchronized with the paging indicators 21 from the serving base station. The first duration $\tau_0$ is typically optimized for good paging performance (3-5 slots) and is also long enough to detect whether or not the signals from a remote base station in a remote cell have been received over a primary synchronization channel (P-SCH), but preferably also relatively short. The relatively short duration implies that a detected new cell will possibly not be identified, which is more time-consuming. The shown period 12 with the receiver on is usually preceded by several periods with the receiver on having the first duration $\tau_0$ and the receiver off between these periods.

The method of determining whether or not certain channels, such as the P-SCH, the S-SCH and the CPICH, of a remote cell have been detected is based on likelihoods.

The calculations typically involve measurements or estimations of the signal strength of the CPICH of the serving cell, or a measurement or an estimation of the signal-to-noise ratio (SNR), and a P-SCH detector. If the SNR drops below a certain threshold $X_1$, a search for new cells (i.e. base stations) begins. Detection of a P-SCH involves e.g. standard correlation techniques using the P-SCH code and the received signal. A better detection can be obtained by repeating this step a first number $N_0$ of times, which may be fixed or depend on the circumstances, in order to get a statistically better detection.

After each "receiver on" period 12 of the first duration $\tau_0$ the mobile terminal assesses the likelihood that a new primary synchronization channel (P-SCH) from a remote base station in a remote cell has been detected. For instance, the P-SCH search should continue if $SNR<X_1$ and $max(P-SCH)>X_2$, where max(P-SCH) is the largest correlation peak from the P-SCH search excluding the peaks corresponding to known cells. The received signal is correlated with the P-SCH synch word, and a number of correlation peaks result, some of which are noise. Correlation peaks representing known cells are excluded, i.e. cells that are already detected and included in the UE neighbour list. Then it seems to be a reasonable assumption that if the largest of the remaining peaks is above the threshold $X_2$, then it might be a real peak and not a noise peak.

If in state 501, after state 502, no new P-SCH is detected, or if the SNR is above the threshold, the signal processing is discontinued, and the mobile terminal returns to state 502 and waits until the next time the receiver in the mobile terminal is to receive data, i.e. the next paging indicator 21.

If after state 502 a new P-SCH has likely been detected, the cell search goes into state 503, where the receiver is turned on for a period 13 with a second duration $\tau_1$, which is longer than the first duration $\tau_0$. Here, too, a better detection can be obtained by repeating this step a second number $N_1$ of times, which may also be fixed or depend on the circumstances, in order to get a statistically better detection.

In state 503 methods and algorithms for detecting the secondary synchronization channel (S-SCH), i.e. timing information about the remote cell, can be used optionally. Again, correlation methods can be used, where correlation between the received signal and the S-SCH is calculated.

If in state 508, after state 503, a new P-SCH has not likely been detected, then, depending on whether or not the optional search for the S-SCH has been made and the outcome thereof, the cell search goes back to state 502 or 503. Preferably, the cell search goes to state 502 if S-SCH is not present and to state 503 is S-SCH is present.

If a new P-SCH and also a new S-SCH have likely been detected, then the cell search goes into state 504 based on a decision in state 510. If a new P-SCH has likely been detected, but no new S-SCH has likely been detected, then the cell search goes into state 505.

In state 504 the receiver is turned on for a period 14 with a third duration $\tau_2$, which is longer than the second duration $\tau_1$. Methods and algorithms for detecting the secondary synchronization channel (S-SCH), i.e. timing information about the remote cell, are performed. Optionally, also a search for the common pilot channel (CPICH) is also performed, i.e. a search for scrambling codes (over more than one code group, since the S-SCH is possibly not yet perfectly detected yet) in order to find the CPICH for the new cell. Also in state 504 the searches for the S-SCH and the CPICH can advantageously be performed repeatedly a third number $N_2$ of times, which gives a statistically better detection of both searched channels.

If after state 504 a CPICH has been detected, this means that a new remote cell has been successfully detected and identified, and depending on the quality of the communication with the serving cell it may or may not be decided in step 511 to switch over to the newly identified or another successfully identified remote cell. If the CPICH has been detected successfully the new cell is identified in step 514.

If after state 504 a CPICH has not been detected, and a S-SCH has been detected, the search goes into state 506 based on a decision in step 512 and searches for the CPICH with the receiver turned on for a period 15 of a fourth duration $\tau_3$ which can be different from $\tau_2$. This search can advantageously be performed repeatedly a fourth number $N_3$ of times.

If after state 506 a CPICH has been detected, this means that a new remote cell has been successfully detected and identified. If after state 504 neither a CPICH nor a S-SCH have been detected, or after state 506 a CPICH has not been detected, the search goes into state 507, where it is decided, depending on the circumstances such as the degree of uncertainty in earlier decisions, to return to an appropriate one of the states 502, 503, 504 and 505.

The preferred method of the invention illustrated in FIG. 5 includes several steps of detecting one or more of the channels P-SCH, S-SCH and CPICH. One or more of the steps can be selected to be performed, whereby others are omitted. In one example, a criterion for determining whether a channel is present is based on calculating peak value of a correlation between the channel as received and a predefined synchronization sequence, wherein the channel is selected from the group of P-SCH, S-SCH and CPICH.

Figure 6:
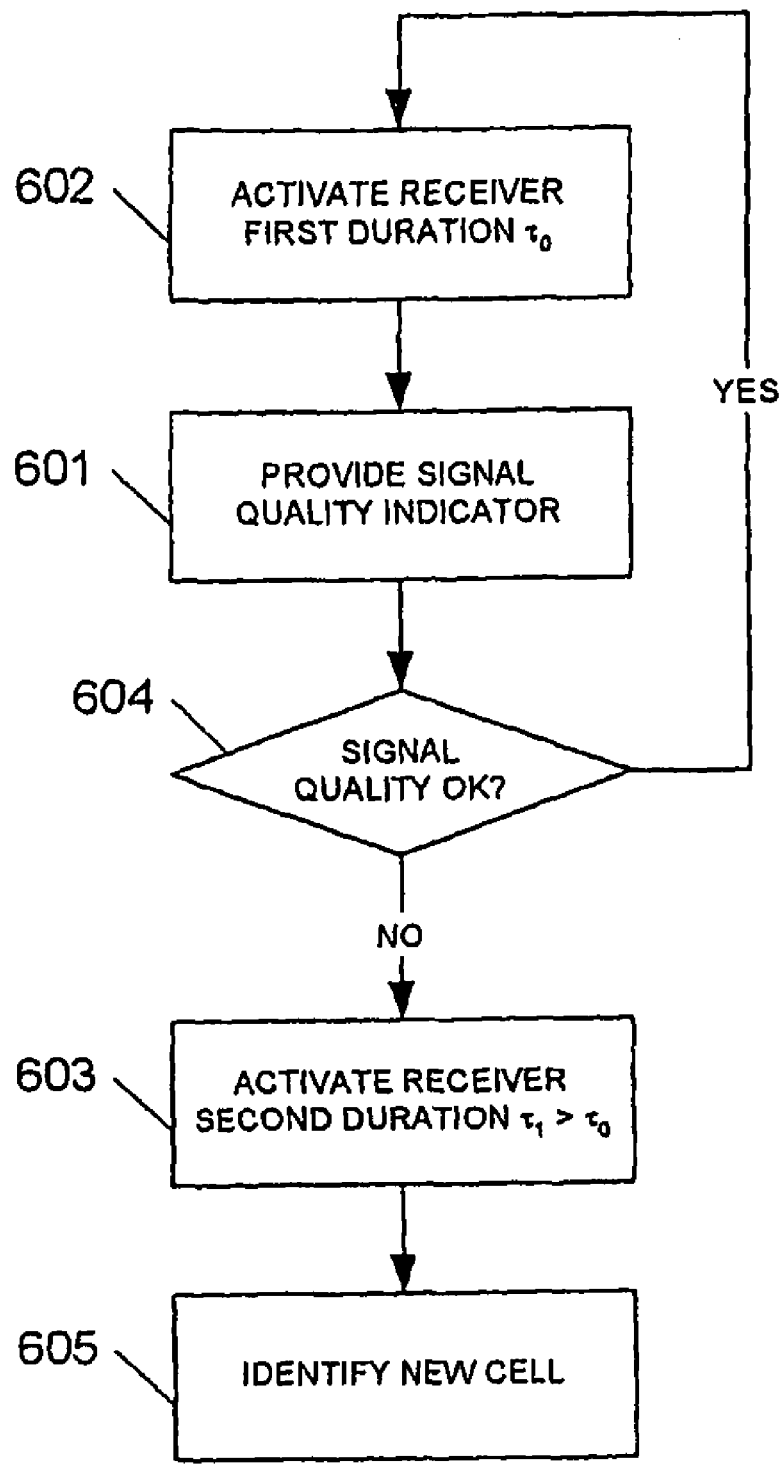
FIG. 6 is a simplified flow chart illustrating the basic principles of the invention.

FIG. 6 is a simplified flow chart illustrating the basic principles of the invention. Corresponding to state 502 in FIG. 5, in state 602 the receiver is activated in a series of periods 12 of the first duration $\tau_0$, which is relatively short, and a signal quality indicator is provided in state 601. The signal quality indicator indicates a signal quality in the above-mentioned periods. As described above, the signal quality indicator is preferably the signal-to-noise ratio, SNR, of the signal received from the serving base station 20. If, in state 604, the signal quality is determined to be satisfactory, i.e. above a predetermined threshold, there is no need to search for a new cell, and the method returns to state 602 and the next period with the receiver activated is set to have the first duration $\tau_0$. If the signal quality is not satisfactory, i.e. below the predetermined threshold, the method enters state 603 corresponding to state 503, where the receiver is activated in a period 13 of the second duration $\tau_1$, which is longer than the first duration $\tau_0$. After state 603 the method goes into state 605 in which a new cell is identified which may include some or all of the steps following state 503 in FIG. 5.

It should be noted that the 'feature of the signals' indicated by means of the signal indicator can a signal-to-noise feature or another feature such as a signal-to-interference feature or a combination of different features.

The invention claimed is:

1. A method of reducing power consumption in a mobile communication unit for use in a Wideband Code Division Multiple Access (WCDMA) communication system, comprising:
   transmitting by a serving base station to the mobile communication unit, at predetermined intervals, signals comprising a paging indicator;
   transmitting by a remote base station individual identification signals for use by the mobile communication unit for identifying the remote base station having transmitted the individual identification signals, wherein the signals from the serving base station are on the same carrier frequency as the signals from the remote base station;
   switching by the mobile communication unit from standby mode to active mode periodically to receive the signals comprising the paging indicator from the serving base station and to receive individual identification signals from the remote base station;
   providing by the mobile communication unit a signal indicator indicating a feature of the signals comprising the paging indicator signal received from the serving base station during a first period of a first duration ($\tau_0$, $\tau_1$, $\tau_2$, or $\tau_3$), wherein the signal indicator being based on a measurement of a signal-to-noise ratio of received signals from the serving base station;
   switching by the mobile communication unit from standby mode to active mode for a second period of a second duration ($\tau_0$, $\tau_1$, $\tau_2$, or $\tau_3$) that is set in dependence on the value of the signal indicator provided by the mobile communication unit; and
   identifying the remote base station having transmitted the individual identification signals for detecting whether a primary synchronization channel (P-SCH) is present using the individual identification signals;
   detecting whether the primary synchronization channel (P-SCH) is present at different periods with different durations ($\tau_0$, or $\tau_1$);
   if the primary synchronization channel (P-SCH) is not present based on a measurement during the first period of a least selectable first duration ($\tau_0$), performing a repeated step of detecting whether the primary synchronization channel (P-SCH) is present;
   if the primary synchronization channel (P-SCH) is present, performing a repeated step of detecting whether the primary synchronization channel (P-SCH) is present, but based on a measurement during the second period of the second duration ($\tau_1$) that is greater than the first duration ($\tau_0$);
   using the individual identification signals for detecting whether a secondary synchronization channel (S-SCH) is present; and
   detecting whether the secondary synchronization channel (S-SCH) is present at different periods with different durations ($\tau_1$, or $\tau_2$).

2. The method according to claim 1, further comprising that if the signal indicator value is smaller than a predetermined value, then the second duration ($\tau_0$, $\tau_1$, $\tau_2$, or $\tau_3$) is set equal to the first duration ($\tau_0$, $\tau_1$, or $\tau_2$).

3. The method according to claim 1, further comprising that if the signal indicator provides a value which is greater than or equal to a predetermined value, then the second duration ($\tau_1$ or $\tau_2$) is set greater than the first duration ($\tau_0$ or $\tau_1$).

4. The method according to claim 1, further comprising:
   if a primary synchronization channel (P-SCH) for a remote cell is present, based on a measurement during a second period of a second duration ($\tau_1$) that is greater than the first duration ($\tau_0$), detecting whether a secondary synchronization channel (S-SCH) is present, based on a measurement during a third period with a duration ($\tau_2$) that is greater than the duration ($\tau_1$) of the second period.

5. The method according to claim 1, wherein the individual identification signals are used for detecting whether a common pilot channel (CPICH) is present.

6. The method according to claim 1 wherein a criterion for determining whether a channel is present is based on calculating a signal-to-noise ratio for the channel as received and comparing the calculated signal-to-noise ratio with a threshold value; and
   wherein the channel is selected from the group of Primary Synchronization Channel (P-SCH), Secondary Synchronization Channel (S-SCH) and Common Control Pilot Channel (CPICH).

7. The method according to claim 1 wherein a criterion for determining whether a channel is present is based on calculating peak value of a correlation between the channel as received and a predefined synchronization sequence;
   wherein the channel is selected from the group of Primary Synchronization Channel (P-SCH), Secondary Synchronization Channel (S-SCH) and Common Control Pilot Channel (CPICH).

8. A mobile communication unit suitable for operating in a Wideband Code Division Multiple Access (WCDMA) communication system, comprising:
   a receiver adapted to periodically switch between active and standby mode to receive signals comprising a paging indicator from a serving base station, and to receive at least one individual identification signal from a remote base station, wherein the signals from the serving base station are on the same carrier frequency as the signals from the remote base station, the receiver being operable to provide a signal indicator indicating a feature of the signals received from the serving base station during a first period of a first duration ($\tau_0$, $\tau_1$, $\tau_2$, or $\tau_3$), wherein the signal indicator is based on a measurement of a signal-to-noise ratio of received signals from the serving base station and to switch from standby mode to activate mode for a second period of a second duration ($\tau_0$, $\tau_1$, $\tau_2$, or $\tau_3$) that is set in dependence on the signal indicator of the mobile communication unit;
   the mobile communication unit being adapted to identify the remote base station having transmitted the at least one individual identification signal to detect whether a primary synchronization channel (P-SCH) is present using the at least one individual identification signal;
   the mobile communication unit being adapted to detect whether the primary synchronization channel (P-SCH) is present at different periods with different durations ($\tau_0$, or $\tau_1$);
   if the primary synchronization channel (P-SCH) is not present based on a measurement during the first period of a least selectable first duration ($\tau_0$), performing a repeated step of detecting whether the primary synchronization channel (P-SCH) is present;
   if the primary synchronization channel (P-SCH) is present, performing a repeated step of detecting whether the primary synchronization channel (P-SCH) is present, but based on a measurement during the second period of the second duration ($\tau_1$) that is greater than the first duration ($\tau_0$);
   the mobile communication unit being adapted to use the individual identification signals to detect whether a secondary synchronization channel (S-SCH) is present; and
   the mobile communication unit being adapted to detect whether the secondary synchronization channel (S-SCH) is present at different periods with different durations ($\tau_1$, or $\tau_2$).

9. The mobile communication unit according to claim 8, wherein if the signal indicator provides a value which is smaller than a predetermined value, then the second duration ($\tau_0$, $\tau_1$, $\tau_2$, or $\tau_3$) is set equal to the first duration ($\tau_0$, $\tau_1$, or $\tau_2$).

10. The mobile communication unit according to claim 8, wherein if the signal indicator provides a value which is greater than or equal to a predetermined value, then the second duration ($\tau_1$ or $\tau_2$) is set greater than the first duration ($\tau_0$ or $\tau_1$).

11. The mobile communication unit according to claim 8, further comprising the mobile communication unit being adapted to use the individual identification signals to detect whether a common pilot channel (CPICH) is present.

12. A method of reducing power consumption in a mobile communication unit for use in a Wideband Code Division Multiple Access (WCDMA) communication system, comprising:
   transmitting by a serving base station to the mobile communication unit, at predetermined intervals, signals comprising a paging indicator;
   transmitting by a remote base station individual identification signals for use by the mobile communication unit for identifying the remote base station having transmitted the individual identification signals, wherein the signals from the serving base station are on the same carrier frequency as the signals from the remote base station;
   switching by the mobile communication unit from standby mode to active mode periodically to receive the signals comprising the paging indicator from the serving base station and to receive individual identification signals from the remote base station;
   providing by the mobile communication unit a signal indicator indicating a feature of the signals comprising the paging indicator signal received from the serving base station during a first period of a first duration ($\tau_0$, $\tau_1$, $\tau_2$, or $\tau_3$), wherein the signal indicator being based on a measurement of a signal-to-noise ratio of received signals from the serving base station;
   switching by the mobile communication unit from standby mode to active mode for a second period of a second duration ($\tau_0$, $\tau_1$, $\tau_2$, or $\tau_3$) that is set in dependence on the value of the signal indicator provided by the mobile communication unit;
   identifying the remote base station having transmitted the individual identification signals for detecting whether a primary synchronization channel (P-SCH) is present using the individual identification signals;
   detecting whether the primary synchronization channel (P-SCH) is present at different periods with different durations ($\tau_0$, or $\tau_1$);
   determining whether a secondary synchronization channel (S-SCH) is present, in the event the primary synchronization channel (P-SCH) for the remote base station is not present based on the measurement during the second period of the second duration ($\tau_1$) that is greater than the first duration ($\tau_0$);
   repeating to detect whether the primary synchronization channel (P-SCH) is present based on a measurement during a first period of a least selectable first duration ($\tau_0$), in the event the secondary synchronization channel (S-SCH) is not present; and
   detecting whether the primary synchronization channel (P-SCH) is present based on a measurement during the second period of the second duration ($\tau_1$) that is greater than the first duration, if the secondary synchronization channel (S-SCH) is present.

13. A mobile communication unit suitable for operating in a Wideband Code Division Multiple Access (WCDMA) communication system, comprising:
   a receiver adapted to periodically switch between active and standby mode to receive signals comprising a paging indicator from a serving base station, and to receive at least one individual identification signal from a remote base station, wherein the signals from the serving base station are on the same carrier frequency as the signals from the remote base station, the receiver being operable to provide a signal indicator indicating a feature of the signals received from the serving base station during a first period of a first duration ($\tau_0$, $\tau_1$, $\tau_2$, or $\tau_3$), wherein the signal indicator is based on a measurement of a signal-to-noise ratio of received signals from the serving base station and to switch from standby mode to activate mode for a second period of a second duration ($\tau_0$, $\tau_1$, $\tau_2$, or $\tau_3$) that is set in dependence on the signal indicator of the mobile communication unit;

the mobile communication unit being adapted to identify the remote base station having transmitted the at least one individual identification signal to detect whether a primary synchronization channel (P-SCH) is present using the at least one individual identification signal;

the mobile communication unit being adapted to detect whether the primary synchronization channel (P-SCH) is present at different periods with different durations ($\tau_0$, or $\tau_1$);

the mobile communication unit being adapted to determine whether a secondary synchronization channel (S-SCH) is present, in the event the primary synchronization channel (P-SCH) for the remote base station is not present based on a measurement during the second period of the second duration ($\tau_1$) that is greater than the first duration ($\tau_0$);

the mobile communication unit being adapted to repeat to detect whether primary synchronization channel (P-SCH) is present based on a measurement during the first period of a least selectable first duration ($\tau_0$), in the event the secondary synchronization channel (S-SCH) is not present; and the mobile communication unit being adapted to detect whether the primary synchronization channel (P-SCH) is present based on a measurement during the second period of the second duration ($\tau_1$) that is greater than the first duration, if the secondary synchronization channel (S-SCH) is present.

* * * * *

UNITED STATES PATENT AND TRADEMARK OFFICE
CERTIFICATE OF CORRECTION

PATENT NO. : 7,990,901 B2
APPLICATION NO. : 10/557958
DATED : August 2, 2011
INVENTOR(S) : Lindoff et al.

It is certified that error appears in the above-identified patent and that said Letters Patent is hereby corrected as shown below:

On the Cover Page, item (57), under "ABSTRACT", in Column 2, Line 9, delete "an" and insert -- on --, therefor.

On the Cover Page, item (57), under "ABSTRACT", in Column 2, Line 14, delete "Power" and insert -- power --, therefor.

In Fig. 3a, Sheet 2 of 4, in Line 1, delete "TE CELL" and insert -- REMOTE CELL --, therefor.

In Fig. 3a, Sheet 2 of 4, in Line 2, delete "NG CELL" and insert -- SERVING CELL --, therefor.

Signed and Sealed this
Thirty-first Day of January, 2012

David J. Kappos
*Director of the United States Patent and Trademark Office*